United States Patent [19]

Sagey

[11] Patent Number: 5,218,618
[45] Date of Patent: Jun. 8, 1993

[54] CELLULAR TELEPHONE SERVICE USING SPREAD SPECTRUM TRANSMISSION

[75] Inventor: William E. Sagey, Orange, Calif.

[73] Assignee: Hughes Aircraft Company, Los Angeles, Calif.

[21] Appl. No.: 609,851

[22] Filed: Nov. 7, 1990

[51] Int. Cl.$^5$ .................... H04L 27/30; H04M 11/00
[52] U.S. Cl. .................................... 375/001; 380/34; 342/457; 379/59; 455/33.1; 455/54.1
[58] Field of Search ............. 375/1; 380/34; 342/457; 340/539; 379/59, 60; 455/33.1, 33.2, 54.1

[56] References Cited

U.S. PATENT DOCUMENTS

| | | | |
|---|---|---|---|
| 3,714,573 | 1/1973 | Grossman | 375/1 X |
| 4,222,115 | 9/1980 | Cooper et al. | 375/1 |
| 4,229,620 | 10/1980 | Schaible | 379/60 X |
| 4,654,879 | 3/1987 | Goldman et al. | 455/33.2 |
| 4,700,374 | 10/1987 | Bini | 379/60 |
| 5,055,851 | 10/1991 | Sheffer | 342/457 |

Primary Examiner—Bernarr E. Gregory
Attorney, Agent, or Firm—Wanda K. Denson-Low

[57] ABSTRACT

A spread spectrum processing system that employs wide bandwidth spread spectrum radio transmissions overlaid over the existing cellular voice signals to simultaneously provide additional cellular services without causing objectionable interference to current users of the cellular voice channel. The spread spectrum radio transmissions also support a large number of low rate digital messages. Both vehicle location and messaging functions are obtained without sacrificing any of the existing voice channel capacity. The cell site processor is designed to share the existing cellular frequencies, real estate, antenna towers, antennas, and low noise amplifiers used in the cell site radio frequency receiver chain. The only additional cell site equipment is the spread spectrum signal processor. The processing system provides a means for achieving vehicle location accuracies that are improved by greater than two orders of magnitude over that which is possible by the current transmissions in that band. It provides a means of achieving transmit power control of the vehicle transmitter to combat the extremely large variation (dynamic range) of radio signal path loss to the receiving sites. It also provides a means of excising at the receiver the excessively strong conventional voice cellular signals that are not under power control which ordinarily might interfere with the successful reception of the new broadband signals.

21 Claims, 4 Drawing Sheets

CELLULAR TELEPHONE SERVICE USING SPREAD SPECTRUM TRANSMISSION

BACKGROUND

The present invention relates generally to cellular telephone systems, and more particularly, to a cellular telephone system that employs spread spectrum transmission to provide additional services without degrading the existing voice communications service, while utilizing much of the present cellular telephone infrastructure.

The cellular telephone band was designed to carry a large number of two-way voice conversations to mobile users. In addition to two way voice communication, there is interest in using the cellular telephone band to provide vehicle location and messaging services, emergency SOS information, and vehicle anti-theft protection services, for example. However, current systems that are confined to narrow band voice channels of the cellular band produce location accuracies that are about two orders of magnitude lower than are required to provide these services, and these are generally not useful for most applications.

Previous nationwide vehicle location systems, disclosed in U.S. Pat. Nos. 4,359,733 and 4,740,792, for example, have not come to fruition to date because of the relatively high start up capital cost of using satellites. Other nationwide location systems are planned (TELETRAC and GEOSTAR), but they operate in frequency bands other than the cellular band and therefore require a very expensive special purpose infrastructure. The IBM-Motorola mobile data service currently operational in the New York, Chicago and Los Angeles areas also requires a special purpose infrastructure which results in high usage fees.

The use of spread spectrum communications in conjunction with the cellular voice channel has been investigated in recent years. One implementation proposed by Qualcomm, Inc. of San Diego, Calif., would partition the cellular band such that a 1 MHz frequency band would be dedicated to each of the transmit and receive bands for spread spectrum voice communication, while the balance of the two bands would continue to provide standard cellular service. As spread spectrum systems increased in usage, the spread spectrum portion of the bands would increase in size to match the need. It is apparent that, since this proposed system requires its own dedicated frequency subbands, that the Qualcomm implementation of spread spectrum communication would interfere with the operation of the standard cellular voice channels.

Accordingly, it is an objective of the present invention to employ technology that overlays the narrow band cellular telephone voice signals with wide band spread spectrum signals to provide for messaging and vehicle tracking capabilities without adversely affecting the quality or capacity of the voice channels.

SUMMARY OF THE INVENTION

The present invention enables the incorporation of messaging and vehicle location capabilities into existing cellular services without causing objectionable interference to users of the cellular voice channels. A spread spectrum processor that utilizes a unique signal architecture/waveform design is the key to this capability.

Through the use of wide bandwidth spread spectrum radio transmissions overlaid over the existing cellular voice signals, new services which depend on the ability to accurately locate vehicles are provided. In addition, a second class of spread spectrum radio transmissions supports a large number of users transmitting low rate digital messages. Both areas of functionality (vehicle location and messages) are obtained without sacrificing any of the existing voice channel capacity. By employing the concepts of the present invention, since a large fraction of the cellular telephone infrastructure may be used in common, a large savings in deployment costs results.

The system of the present invention is designed to share the existing cellular frequencies, cell site real estate, cell site antenna towers and antennas, and low noise amplifiers used in the cell site radio frequency receiver chain. The only additional cell site equipment is a unique spread spectrum signal processor. New mobile telephone equipment for deployment in vehicles would include a spread spectrum transmitter in accordance with the present invention. Thus, this system has the economic viability for both regional and nationwide deployment. When compared to a nationwide system using a satellite infrastructure, the vehicular electronics package requires a much lower power transmitter because the transmission distances are of the order of 20 miles, instead of 20,000 miles for systems that use satellites. Vehicle transmitter power may be reduced from hundreds of watts to less than one watt with a consequent downward revision in cost per unit.

The present invention permits dual usage of the frequency spectrum assigned for cellular telephone service. Currently voice conversations are supported by dividing the spectral space into individual 30 KHz channels. Cellular service suppliers are assigned blocks of channels in contiguous fashion covering bandwidths in excess of 10 MHz. Through the use of unique spread spectrum waveforms (which spread energy over the full 10 MHz bandwidth), digital signalling is supported in the same spectral space and in the presence of the existing voice traffic. At the same time no objectionable interference is generated to affect the existing traffic since the spread spectrum transmissions are either below the normal noise levels for digital messaging, or of such short duration that they are imperceptible in the normal burst noise background for position location applications.

Two new classes of functionality are created by the present invention. Class I is a digital messaging service that permits the simultaneous transmission from nominally 100 vehicles each sending data messages at the rate of 300 bits per second to access the normal telephone network. The other class of digital signalling (Class II) provides for the accurate location of vehicles, with accuracies on the order of 100 feet. The applications of this technology are numerous. For instance, if a motion sensor coupled to the system identifies that a vehicle theft is in progress, thus energizing the vehicular transmitter, the system permits location tracking of the vehicle for law enforcement officers. Police, ambulance and/or tow truck service may be directed to an exact location. Customized yellow pages directory service which depends on knowledge of vehicle location may also be facilitated.

For vehicle location, a burst spread waveform pattern having a burst duration on the order of 10 milliseconds or less is employed to maximize location accuracy and to minimize interference which is naturally suppressed by the clipping action of the existing narrowband cellular FM receivers. For vehicle location, the spread spectrum system employs rapid synchronization techniques and uses a single code for access to the system by the transmitting vehicle.

In anti-theft applications, when it is necessary to make a number of sequential location measurements in a relatively short period of time, a waveform variant may be used. In this case, the entire band of cellular frequencies could be divided into n (say 10) narrower spread spectrum channels with center frequencies at $f_1$ through $f_n$. Then each burst transmission (the pulse amplitude and duration remain unchanged) would be sent at a new center frequency. The reduced bandwidth transmissions sacrifices some location accuracy, but distributes the imperceptible voice channel blockage to a new set of voice users with each transmission. Thus, the non-objectionable interference characteristic is preserved.

For messaging, a below the noise continuous wave (CW) spread spectrum waveform is employed which is naturally suppressed by the FM limiters in the existing narrowband cellular receivers. The service request and power control architecture is employed to minimize interference and maximize message capacity, The system could use a number of separate spread spectrum codes to facilitate load distribution within a cell site and between cell sites. The code reuse concept is analogous to the frequency reuse technique currently in use in the existing cellular system.

In summary, the present invention provides for the following. First, it provides a means of radiating from a vehicle a signal in the transmit band of the national cellular telephone system without causing objectionable interference to the voice telephone users of that band. Second, it provides a means for achieving vehicle location accuracies that are improved by greater than two orders of magnitude over that which is possible by the current transmissions in that band. Third, it incorporates a means of achieving transmit power control of the vehicle transmitter to combat the extremely large variation (dynamic range) of radio signal path loss to the receiving sites. The main variables are distance and the multipath caused by intervening obstructions to the line of site due to buildings, terrain features and other vehicles. Fourth, it incorporates a means of excising at the receiver the excessively strong conventional voice cellular signals that are not under power control which ordinarily might interfere with the successful reception of the new broadband signals.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
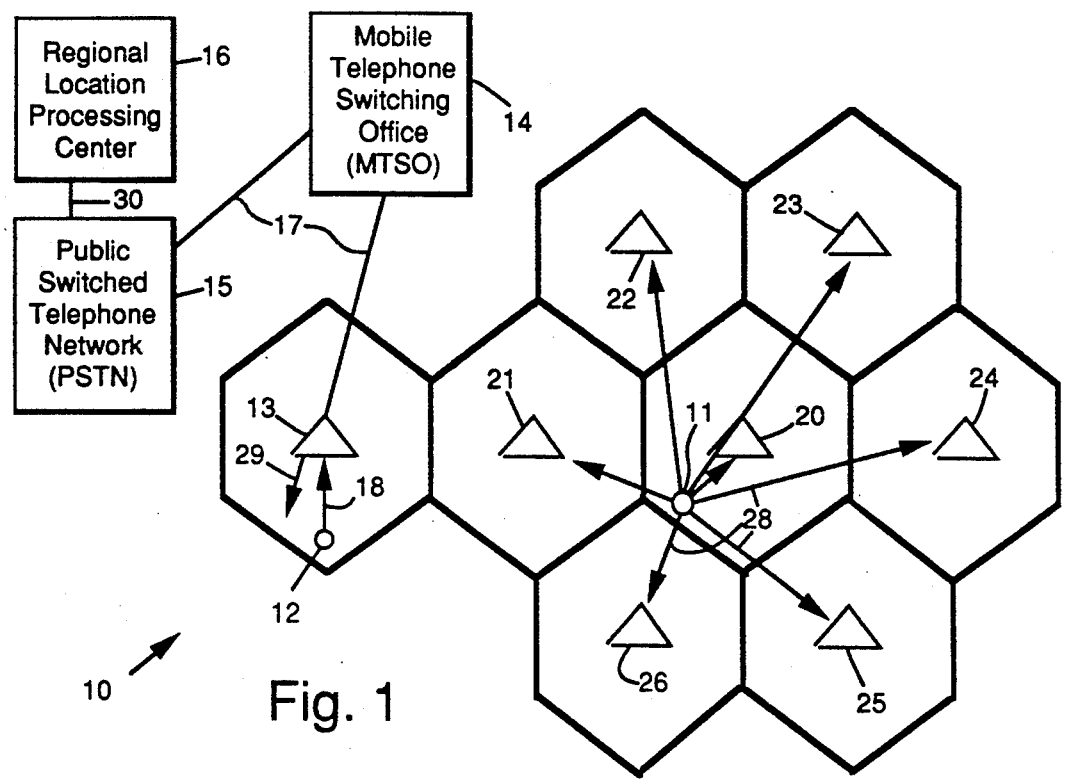
FIG. 1 illustrates a cellular system incorporating spread spectrum signal processors in accordance with the principles of the present invention.

With reference to the drawings, FIG. 1 illustrates a cellular system 10 implemented using the principles of the present invention, and also illustrates the operation of the two main services provided by the present invention, namely, vehicle location and messaging services. More specifically, the cellular system 10 includes a plurality of cell sites 13, 20-26. A first vehicle having a first vehicle transmitter 11 is located within a central cell site 20 while a second vehicle having a second transmitter 12 is located within a local cell site 13. The first transmitter 11 is shown transmitting a vehicle location signal 28 to each of the local cell sites 20-26 adjacent thereto. The second transmitter 12 is shown transmitting a digital message 18 or second spread spectrum signal 18 to the local cell site 13, while the local cell site 13 is shown transmitting a probe signal 29, which signals will be described in more detail below. The local cell site 13 and cell sites 20-26 (but not shown for diagram clarity) are coupled to a mobile telephone switching office (MTSO) 14 by way of a microwave communications link 17 which in turn is coupled through a public switched telephone network 15 by way of the microwave communications link 17 to a regional location processing center 16 using a wired connection path 30. The conventional aspects of the cellular system 10 are well known to those in the cellular communications art and the conventional aspects of its design and operation will not be described in detail herein.

Figure 2:
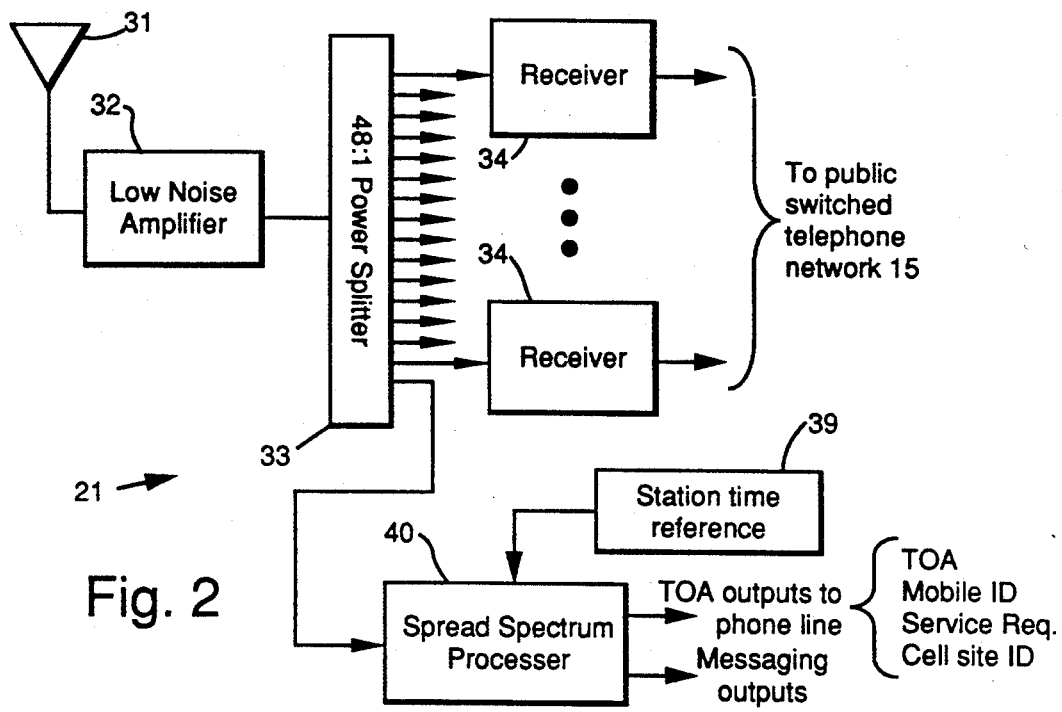
FIG. 2 shows the details of a typical cell site incorporating the present invention.

FIG. 2 shows the details of a typical cell site 21, but also includes a spread spectrum processor 40 in accordance with the principles of the present invention. The typical cell site 21 comprises an antenna 31 that is coupled to a low noise amplifier 32. The low noise amplifier 32 is coupled by way of a 48:1 power splitter 33 to a plurality of receivers 34, typically a subset of the 333 possible receive channels assigned to a single service provider and then to a land based telephone system. The output of the receivers 34 are voice signals that are coupled to the public switched telephone network 15. The spread spectrum processor 40 in accordance with the principles of the present invention is coupled to one output of the 48:1 power splitter 33 and is in turn coupled to the mobile telephone switching office (MTSO) 14, the public switched telephone network 15, and the regional location processing center 16, as described above.

The spread spectrum processor 40 of the present invention is designed to share the existing cellular frequencies, cell site real estate, cell site antenna towers and antennas, and cell site low noise amplifiers and cell site power splitters. Thus, the incorporation of the processor 40 into the cellular system has the economic viability for both regional and nationwide deployment. In addition, the vehicular electronics package for use with the present invention (described with reference to FIGS. 4 and 5 below) requires a much lower power transmitter because of the transmission distances are of the order of 20 miles, instead of 20,000 miles for systems that use satellites. Vehicular transmitter powers may be reduced from hundreds of watts to less than one watt with a consequent downward revision in cost per transmitter 11.

The present invention permits dual usage of the frequency spectrum assigned for cellular telephone service. Currently voice conversations are supported by dividing the spectral space into individual 30 KHz channels. Cellular service suppliers are assigned blocks of channels in contiguous fashion covering bandwidths in excess of 10 MHz. Through the use of unique spread spectrum waveforms (which spread energy over the full 10 MHz bandwidth), digital signalling is supported in the same spectral space and in the presence of the existing voice traffic. At the same time no objectionable interference is generated to affect the existing traffic since the spread spectrum transmissions are either below the normal noise levels for digital messaging, or of such short duration that they are imperceptible in the normal burst noise background for position location applications.

Spread spectrum processors, such as the spread spectrum processor 40 are generally well known in the art, and reference is made to U.S. Pat. No. 4,740,792, the contents of which is incorporated herein by reference. The spread spectrum processor described therein may be readily adapted for use in the present invention. Modifications to the U.S. Pat. No. 4,740,792 processor and the characteristics of the present invention are described hereinbelow. In addition, the present invention may employ a modified Position Location and Reporting System (PLRS) spread spectrum processor, which is manufactured by Hughes Aircraft Company, the assignee of the present invention, for the U.S. Army.

Figure 3:
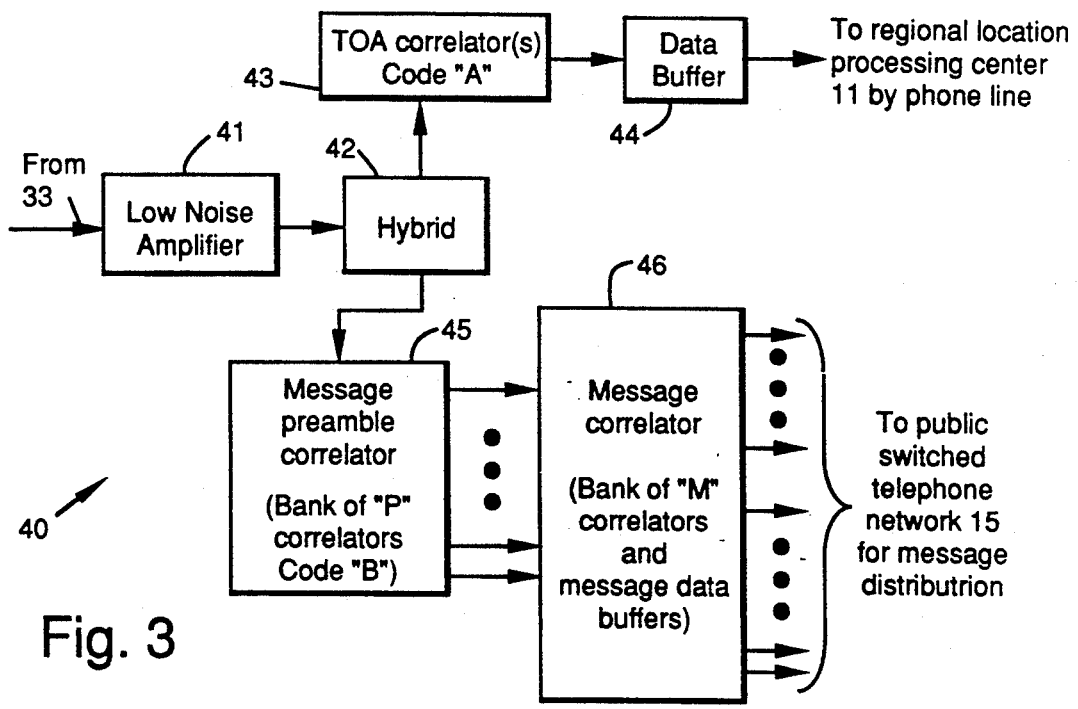
FIG. 3 illustrates the details of the spread spectrum processor of FIG. 2.

FIG. 3 illustrates the details of the spread spectrum processor 40 of FIG. 2. The spread spectrum processor 40 comprises a low noise amplifier 41 that is coupled to a hybrid coupler 42. One output of the hybrid coupler 42 is coupled to one or more time of arrival correlators 43 that are adapted to respond to a Class I message (Code "A"), and transfer output signals therefrom through a data buffer 44 to the regional location processing center 16 by way of conventional telephone lines. The correlator 43 is adapted to sort out signals that may overlap one another due to near-simultaneous, random transmission from different transmitters 11 so that corresponding time differences of arrival of signals received at different cell sites 20-26 transmitted by a particular transmitter 11 may be determined later at the regional location processing center 16 where the individual transmitter locations may be determined. The other output of the hybrid coupler 42 is coupled to a message preamble correlator 45 comprising a bank of "P" correlators adapted to respond to a Class II message (Code "B"), and transfer output signals therefrom through a message correlator 46, comprising a bank of "M" correlators and a corresponding plurality of message buffers, to the public switched telephone network 15 through the mobile switching office 14. The correlators and buffers comprising the message preamble correlator 45 and message correlator 46 are generally well known and will not be described in detail herein. More detail of these types of devices are provided in U.S. Pat. No. 4,740,792.

Figure 4:
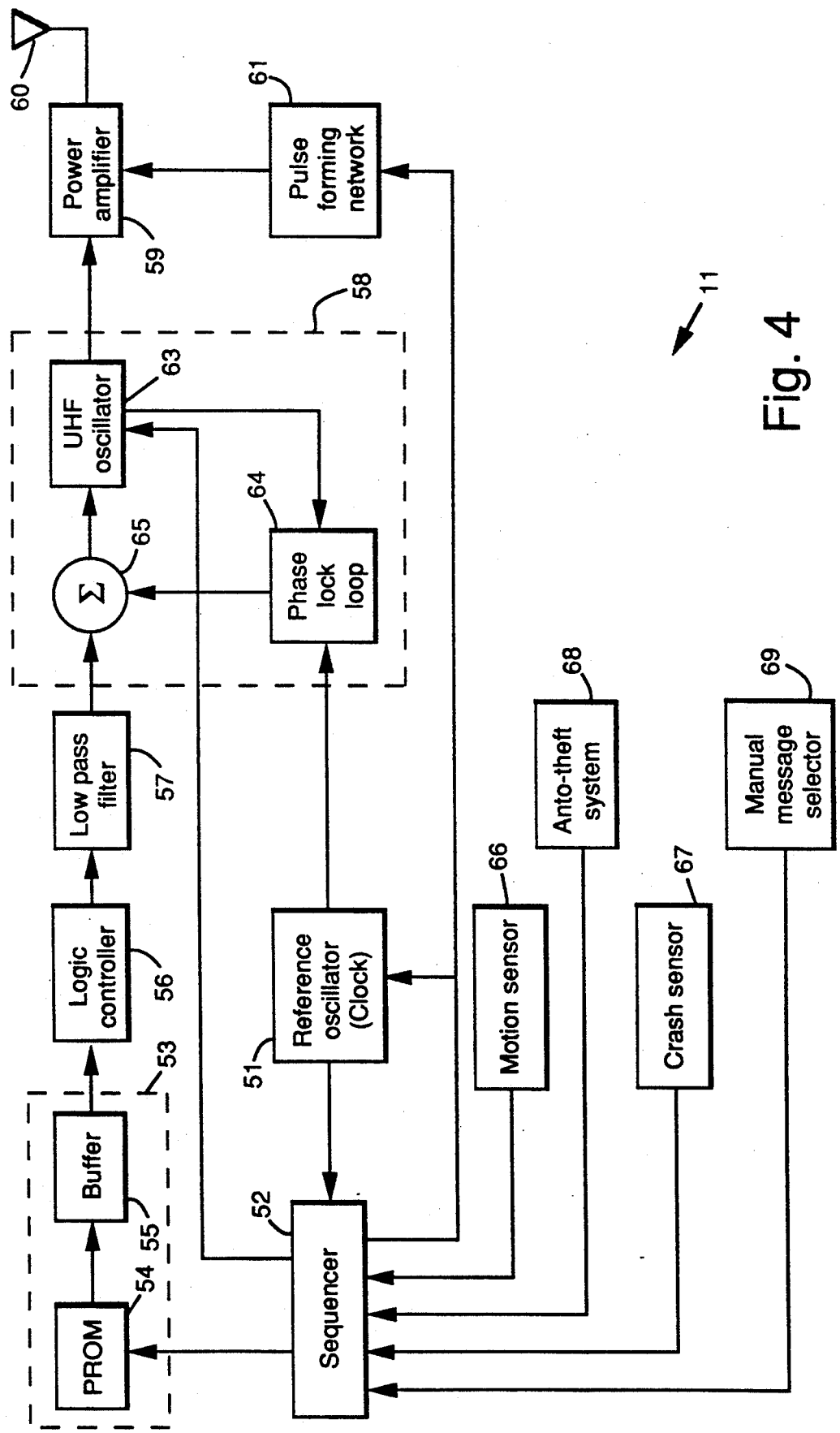
FIGS. 4 and 5 illustrate typical vehicle transmitter configurations incorporating the principles of the present invention.

FIG. 4 illustrates a typical vehicle transmitter 11 incorporating the principles of the present invention that may be employed for the purposes of transmitting emergency information, and the like. The transmitter 11 incorporates a reference oscillator or clock 51, a sequencer or operation timer 52, a memory 53 comprising a PROM 54 and a buffer 55, a logic controller 56, a low pass filter 57 an exciter 58, a power amplifier 59, a pulse forming network 61, and an antenna 60. The exciter 58 comprises an UHF oscillator 63, a phase lock loop 64, and a summer 65. Also included are optional devices, including a motion sensor 66, a crash sensor 67, a vehicle anti-theft system 68 and a manual message selector 69.

The motion sensor 66 and crash sensor 67 preferably comprise conventional accelerometers which may be set or selected for different levels of acceleration. The anti-theft system 68 is any commercially available anti-theft apparatus that provides an electric signal in response to vehicle intrusion, tampering or unauthorized movement. In turn, the message selector 69 may comprise a conventional keyboard or switch (not shown) by means of which several prestored message codes may be selected for encoding in the transmission of the transmitter 11.

In operation, the sequencer 52 controls RF signal repetition rate and formating of a transmitted RF signal. The memory 53, which may comprise the PROM 54, and the data buffer 55, for example, contain signal formatting information, including a transmitter identification code and specific message codes. Codes for a predetermined number of messages, and "accident" or "need assistance" codes may be stored in the PROM 54 and automatically selected by signals from the crash sensor 67 or anti-theft system 68, or manually selected by the manual message selector 69, and which are transmitted under control of the logic controller 56.

Regarding the data transmitted by the transmitter 11, for vehicle location, a burst spread waveform pattern having a burst duration on the order of 10 milliseconds or less is employed to maximize location accuracy and to minimize interference which is naturally suppressed by the clipping action of the existing narrowband cellular FM receivers. For vehicle location, the spread spectrum system employes rapid synchronization techniques and uses a single code for access to the system by the transmitting vehicle.

In anti-theft applications, when it is necessary to make a number of sequential location measurements in a relatively short period of time, a waveform variant may be used. In this case, the entire band of cellular frequencies may be divided into n (say 10) narrower spread spectrum channels with center frequencies at $f_1$ through $f_n$. Then each burst transmission (the pulse amplitude and duration remain unchanged) is sent at a new center frequency. The reduced bandwidth transmissions sacrifices some location accuracy, but distributes the imperceptible voice channel blockage to a new set of voice users with each transmission. Thus, the non-objectionable interference characteristic is preserved.

Figure 5:
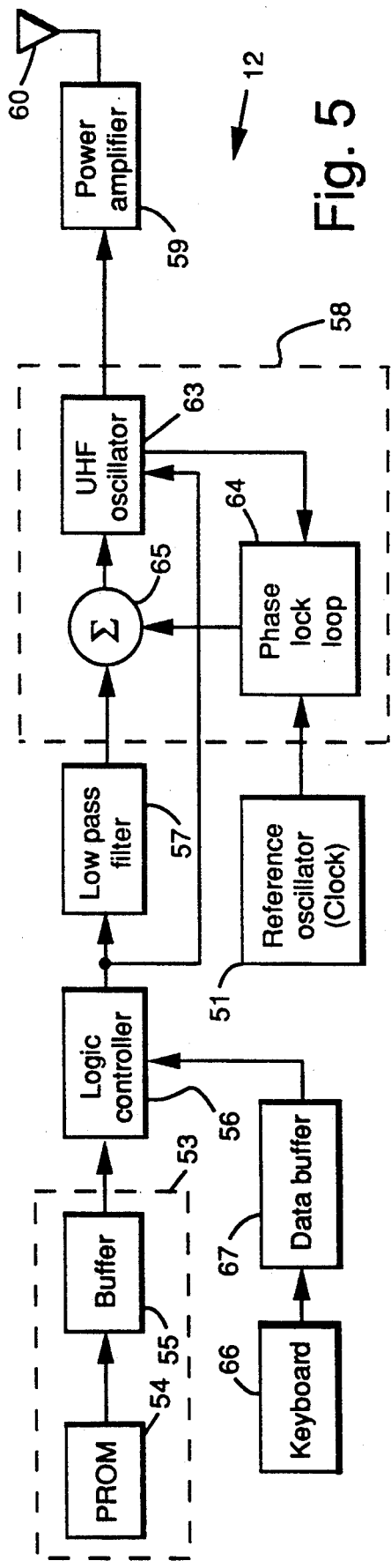

FIG. 5 illustrates a typical vehicle transmitter 12 incorporating the principles of the present invention that may be employed for the purposes of transmitting messages. It is to be understood that the transmitters 11, 12 shown in FIGS. 4 and 5 may be integrated into one single transmitter, and are not limited to use as stand alone units. The transmitter 12 incorporates many of the components described with reference to FIG. 4, including the reference oscillator 51, the memory 53, the logic controller 56, the low pass filter 57, the exciter 58, the power amplifier 59, and the antenna 60. Replacing the remainder of the components is a keyboard 66 that is coupled through a data buffer 67 to the logic controller 56. In operation, the logic controller 56 selects respective inputs from either the keyboard 66 or the memory 53 for transmission from the transmitter 12 in a conventional manner.

Regarding the data transmitted by the transmitter 12, for messaging, a below the noise continuous wave (CW) spread spectrum waveform is employed which is naturally suppressed by the FM limiters in the existing narrowband cellular receivers 34 (FIG. 2). A service request and power control architecture is employed to minimize interference and maximize message capacity. For example, the system may employ a number of separate spread spectrum codes to facilitate load distribution within a cell site and between cell sites. The code reuse concept is substantially analogous to the frequency reuse technique currently in use in the existing cellular system.

Figure 6:
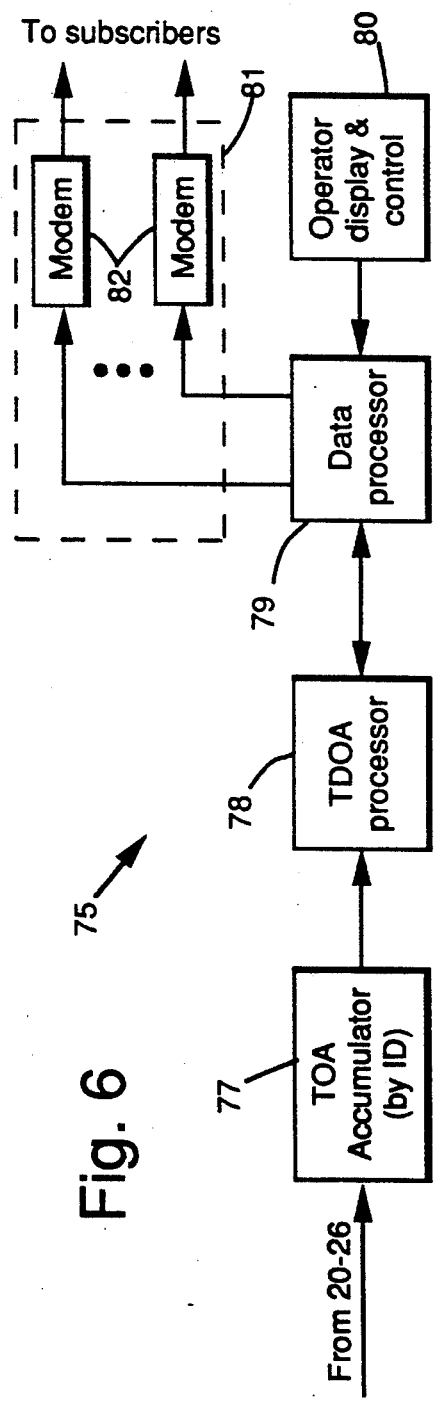
FIG. 6 illustrates a data processing station located in a regional location processing center that processes data obtained from signals produced in accordance with the principles of the present invention.

FIG. 6 illustrates a data processor 75 located in the regional location processing center 15 that processes vehicle location signals 29 produced in accordance with the principles of the present invention and transmitted from the cell sites 20–26 to the regional location processing center 16. The data processor 75 comprises a time of arrival (TOA) accumulator 77, a time difference of arrival (TDOA) processor 78, a data processor 79, an operator display and controller 80 and a subscriber interface 81. The subscriber interface 81 comprises a plurality of modems 82 that are adapted to transmit computed location information to subscribers over conventional phone lines.

Time of arrival measurements made at the cell sites 20–26 are fed to the accumulator 77 where they are sorted by ID. The individual transmitter locations may be determined in a manner described in U.S. Pat. No. 4,740,792. More detailed information regarding the design and operation of the transmitter 11 and data processing station may be had from a reading of U.S. Pat. No. 4,740,792.

Figure 7:
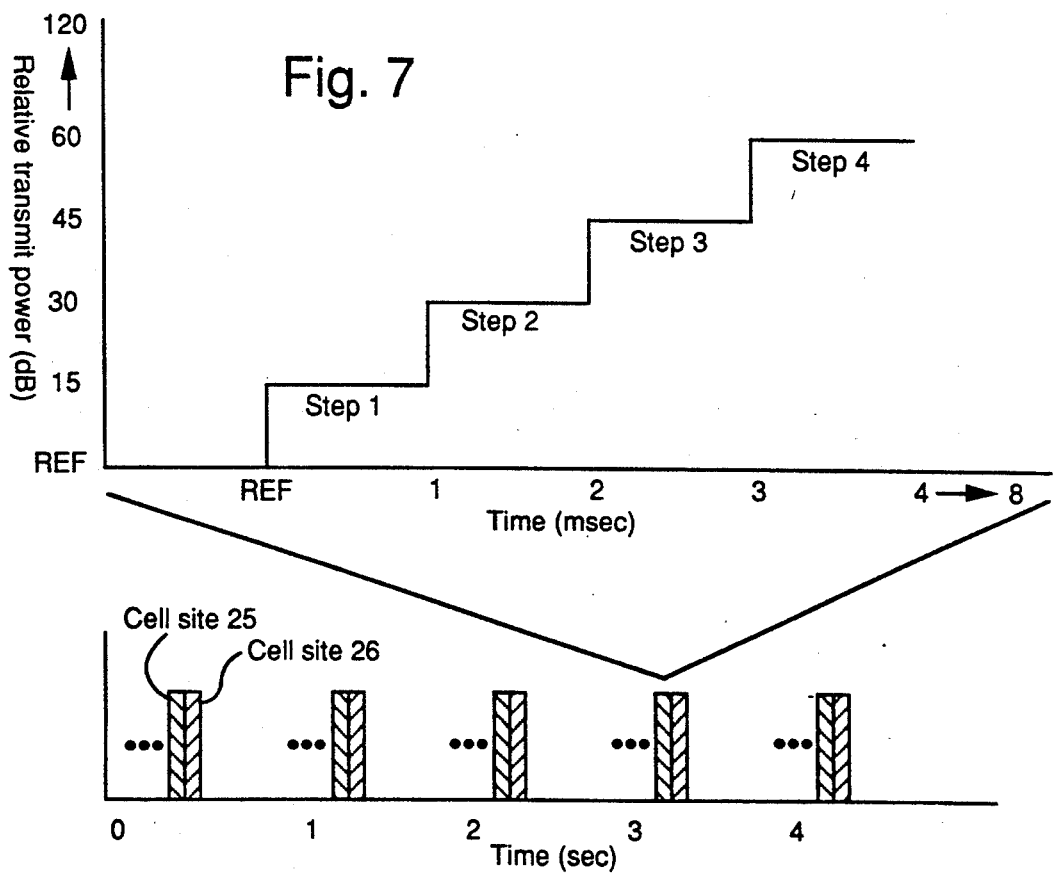
FIG. 7 is useful in illustrating a technique for establishing power level control that employs a multi-step probe signal.

With reference to FIG. 7, the technique for establishing power level control over the vehicle transmitters 11, 12 is as follows. One standard administrative cellular telephone channel (30 KHz wide) is set aside to communicate from cell sites 13, 20–26 to vehicles using the probe signal 29. Because of the greater transmit power available at cell sites, a high rate transmission, TDMA (time division multiple access) digital communications signal is employed. The probe signal 29 is transmitted from cell sites 13, 20–26 to achieve an initial power level setting on the transmitters 11, 12 in vehicles that wish to communicate. On the assumption that most radio frequency transmission paths are bilateral, the probe signal 29 having the form shown in FIG. 7 is employed. The probe signal 29 comprising a short duration pulse (approximately 8 msec) is transmitted every second from each cell site 13, 20–26 with a staircase power level that changes in intensity by 15 dB per step, for example. If the step # signal is too weak to be heard by a particular vehicle transmitter 11, 12, the vehicle transmitter 11, 12 waits until reception is possible at one of the higher power levels. The transmission at each level contains information bits defining the transmitted power levels, the cell site identification number, and the noise levels of signals at that cell site receiver. In this manner, the vehicle transmitter 11, 12 derives information enabling it to set its own power level for successful reception at that site 13, 20–26. The signals transmitted from other cell sites 13, 20–26 are synchronized in time to assure that they do not overlap at a vehicle transmitter 11, 12.

In this manner the optimum cell site receiver is selected. This minimizes the transmit power thus maximizing the overall system capacity.

Referring again to FIG. 1, the overall operation of the system of the present invention will now be described. For vehicle location, the first vehicle transmitter 11 radiates a short (approximately 1 millisecond) burst of spread spectrum coded location signal 28 utilizing a 5 megachip per second (for example) code rate. The short burst duration does not cause objectionable interference even at full power. Full power is used to help ensure reception at the more distant cell cites 21–26. In this case the signal power is spread over a wide bandwidth (100 times the normal voice transmission bandwidth) and therefore its energy density is in the noise of the standard voice signal. The location signal 28 is received at cell sites 20–26, for example. For proper location the location signal 28 need only be heard at three of seven adjacent sites 20–26. The spread spectrum signal processor 40 at each cell site 20–26 decodes the signal to determine the exact time of arrival of the signal, an identification number of the vehicle transmitting the signal, and unique data bits that identify the class of service requested.

This decoded data is "packetized" and sent to the regional location processing center 16. The function of the regional location processing center 16 is to collect and sort all of the information packets concerning a single vehicle transmitter 11 and calculate the difference in the time of arrival of a single transmission burst at respective pairs of cell sites 20–26 that heard the signal 28. Each such pair creates a hyperbolic line of position. At the intersection of at least two of these lines of position, a vehicle location is declared in two dimensional space.

For messaging service, for example, a transmitted message signal comprising the digital message 18 (second spread spectrum signal 18), need only be heard at a single cell site 15. Therefore the signal transmit level of the digital message 18 may be reduced in amplitude from that of the vehicle location signal 28 when messages at 300 bits per second are sent, for example. The messages are typical data messages that are handled in the same manner as voice messages, except that the digital messages are encoded by spread spectrum techniques. The digital message 18 is transmitted to the cell site 13 where its class is decoded. It is then transferred to the public switched telephone network 15 for transmission to the destination contained in the digital message 18.

Two new classes of functionality are created by the present invention. Class I is digital messaging service that permits simultaneous transmission from nominally 100 vehicles each sending data messages at the rate of 300 bits per second to access the public switched telephone network 15. The other class of digital signalling (Class II) provides for the accurate location of vehicles, with accuracies on the order of 100 feet. The applications of this technology are numerous. For instance, if the motion sensor 66 or anti-theft system 69 (FIG. 4) identifies that a vehicle theft is in progress, the system permits location tracking of the vehicle which is reported to law enforcement officers in real time. Police, ambulance and/or tow truck service may be directed to an exact location determined by the present system. Customized yellow pages directory service which depends on knowledge of vehicle location may also be provided.

In summary, the present invention achieves for the following. It provides for additional communication capability using the national cellular telephone system without causing objectionable interference to the voice telephone users. It provides a means for determining vehicle location accuracies that are improved by greater than two orders of magnitude over that which is possible by the current transmissions in the cellular band. It provides for transmit power control of a vehicle transmitter 12 to combat the extremely large variation (dynamic range) of radio signal path loss to the cell sites 20-26. It employs an excisor which removes excessively strong conventional voice cellular signals that are not under power control which ordinarily might interfere with the successful reception of the broadband spread spectrum signals 18, 28.

Presented below is analysis that illustrates the number of simultaneous spread spectrum transmissions that the system 10 supports without causing undue interference on the voice channels if the full 24 MHz of the cellular transmission frequency band is used. The effect of the spread spectrum signals on a narrow band cellular channel is as follows. Given a 3 KHz voice information rate require a a 3 watt power level, a 300 Hz data information rate requires a a 0.3 watt power level. Therefore, a +10 dB advantage exists for the voice signal. Given a 30 KHz voice transmission bandwidth, and a 24 MHz data transmission bandwidth, a +29 dB spreading factor exists. Therefore, a +39 dB voice signal advantage per spread spectrum signal exists. Given a −20 dB loss for 100 simultaneous spread spectrum signals, the signal to noise ratio for the narrow band voice signal is +19 dB for 100 simultaneous spread spectrum channels, which is accepted as good quality by the cellular industry.

The effect of all the voice channel transmissions and the spread spectrum transmissions on the successful reception of a single object spread spectrum transmission is as follows. Given a 24 MHz data transmission bandwidth and a 300 Hz data information rate, a 49 dB processing gain is achieved. If the cellular voice channels are fully loaded, there are 666 narrow band users using 3 watts of power, and this yields 2000 watts of noise (interference) power. If the spread spectrum channel is fully loaded, there are 100 wide band users using 0.3 watts of power, which yields 30 watts of noise (interference) power. This results in a total noise (interference) power of 2030 watts. One spread spectrum user times 0.3 watts yields a 0.3 watt signal power. Therefore, the input signal to noise ratio for the spread spectrum channel is −38 dB. If the processing gain is 49 dB, the output signal to noise ratio is then +11 dB. If there is a +9 dB threshold for adequate bit error rate performance, a margin of 2 dB is provided. However, a communications network is rarely if ever fully loaded, so that additional margin is indicated.

The present invention also provides for flexibility in resource allocation that is achievable by the system 10 using spread spectrum modulation techniques. The present invention provides for matching the channel resource allocation to functional needs, and permits simultaneous mix of different data rate users. For example, the present system permits 100 users to transmit at a 300 bit per second data rate using a 0.3 watt power level, or 10 users to transmit at a 3000 bit per second data rate using a 3.0 watt power level, or 1 user to transmit at a 30,000 bit per second data rate using a 30.0 watt power level.

Thus there has been described a new addition to the existing cellular telephone system that employs spread spectrum transmission to provide additional services without imposing changes on existing system components and without degrading voice communication. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. In a cellular telephone system having a plurality of cell sites comprising voice communication equipment for providing two-way voice communication between mobile telephone units and fixed-plant telephone systems, and wherein each cell cite includes a low noise amplifier coupled to a bank of narrow band voice signal transceivers and an antenna for transmitting and receiving voice communication signals, a location and digital messaging system comprising:

a location processor coupled to the fixed-plant telephone system for processing encoded location messages transmitted thereto from said cell sites, which location messages comprise time of arrival information received by each of the respective cell sites that corresponds to the relative location of a mobile telephone unit that has transmitted a location signal thereto; and a spread spectrum radio transmission system comprising:

a spread spectrum processor coupled to the low noise amplifier of the fixed-plant telephone sites for receiving and processing digital spread spectrum radio transmissions comprising digital messages and location signals, and for forwarding the digital message signals to designations identified therein by way of the fixed-plant telephone system, and forwarding the location signals to a regional processing center for determination of the locations of the transmitting mobile telephone units; and a spread spectrum exciter coupled to the transceiver of each mobile telephone unit for transmitting digital spread spectrum radio transmissions using the antenna thereof, which radio transmissions comprise digital message signals and the location signals that are processed by the fixed-plant telephone system and which are simultaneously transmitted with two-way voice communication signals transmitted by the cellular telephone system without adversely affecting voice transmission.

2. The locations and digital messaging system of claim 1 which further comprises:

probe signal transmitting means located at each of the cell sites for transmitting a probe signal having a predetermined stepped configuration for controlling the transmit power of the transmitters in the mobile telephone units to ensure that the energy density of the digital message signals received at the cell site are below the noise level in each narrow band voice signal transceiver located therein.

3. The location and digital messaging system of claim 2 which further comprises:

probe signal receiving means disposed in the transceiver of each mobile telephone unit for receiving the probe signal transmitted by the probe signal transmitting means and for adjusting the power of the transceiver of the mobile telephone unit in accordance with the strength of the signal received thereby.

4. The location and digital messaging system of claim 1 wherein the burst wave form of the spread spectrum location signals transmitted by each of the spread spectrum exciters is configured to have a duration so that they are imperceptible in the normal burst noise background of the cellular telephone system.

5. The location and digital messaging system of claim 1 wherein the burst wave form of the spread spectrum signals transmitted by each of the spread spectrum exciters is less than 10 milliseconds.

6. The location and digital messaging system of claim 1 wherein for tracking a moving vehicle, the spread spectrum processor comprises means for sequentially transmitting the spread spectrum signals in successively higher spread spectrum subbands, whereby successive spread spectrum tracking signals are sequentially transmitted in successively higher spread spectrum subbands and the process is repeated once the highest subband is reached to eliminate voice user perception during tracking of the vehicle.

7. An improved cellular telephone system for receiving and transmitting voice communication and for providing location and digital messaging between mobile telephone units and a telephone system comprising:
a plurality of cell sites for receiving and transmitting two-way communication between the mobile telephone units and the telephone system, wherein each cell site includes a low noise amplifier;
wherein each mobile telephone unit includes a narrow band voice signal transceiver for transmitting and receiving voice signals, wherein the transceiver operates over a predetermined frequency spectrum; means for generating and transmitting spread spectrum signals including vehicle identification signals and vehicle message signals, wherein the means for generating spread spectrum signals operates over a spread spectrum of the predetermined frequency spectrum and is coupled to the transceiver; and an antenna for transmitting and receiving voice signal and spread spectrum signal;
a spread spectrum processor for receiving and processing vehicle identification signals and vehicle message signals from the spread spectrum signals, wherein each spread spectrum processor is coupled to the low noise amplifier at each cell site,
wherein each cell site includes an antenna for transmitting and receiving voice communication and vehicle identification information and messages to and from the telephone system.

8. The system of claim 7 wherein the spread spectrum processor comprises a hybrid coupler for receiving spread spectrum signals from the low noise amplifier at the cell site, a time of arrival correlator coupled to the hybrid amplifier for generating time of arrival information and a message correlator coupled to the hybrid coupler for generating message information.

9. The system of claim 7 wherein the means for generating and transmitting spread spectrum signals includes a sensor for generating a message signal in response to input from the sensor.

10. The system of claim 9 wherein the sensor comprises a motion sensor for generating information about motion of the mobile telephone unit.

11. The system of claim 9 wherein the sensor comprises a manual message generator which generates a message signal in response to input from a mobile telephone unit user.

12. The system of claim 7 wherein for location signals, the means for generating spread spectrum signals generates a spread spectrum signal having a burst spread wave form pattern having a burst duration on the order of 10 milliseconds or less.

13. The system of claim 7 wherein for message signals, the means for generating spread spectrum signals generates a spread spectrum signal having a continuous wave wave form.

14. A system for providing location and digital messaging using a cellular telephone system, wherein the cellular telephone system includes a plurality of cell sites for receiving and transmitting two-way communication between mobile telephone units and the telephone system, wherein each cell site includes a low noise amplifier; wherein each mobile telephone unit includes a narrow band voice signal transceiver for transmitting and receiving voice signals, wherein the transceiver operates over a predetermined frequency spectrum; comprising:
a plurality of vehicle location transmitters, each comprising means for generating and transmitting spread spectrum signals including vehicle identification signals and vehicle message signals, wherein the means for generating spread spectrum signals operates over a spread spectrum of the predetermined frequency spectrum; and
a plurality of spread spectrum processors for receiving and processing vehicle identification signals and vehicle message signals from the spread spectrum signals, wherein each spread spectrum processor is coupled to the low noise amplifier at each cell site;
wherein each cell site includes an antenna for transmitting and receiving voice communication and vehicle identification information and messages to and from the telephone system.

15. The system of claim 14 wherein each vehicle locator transmitter is collocated with a mobile telephone unit.

16. The system of claim 15 wherein the means for generating and transmitting spread spectrum signals includes a spread spectrum exciter and wherein the spread spectrum exciter is coupled to the transceiver in the mobile telephone unit.

17. The system of claim 14 wherein the means for generating and transmitting spread spectrum signals includes a sensor for generating a message signal in response to input from the sensor.

18. The system of claim 17 wherein the sensor comprises a motion sensor for generating information about motion of the mobile telephone unit.

19. The system of claim 17 wherein the sensor comprises a manual message generator which generates a message signal in response to input from a mobile telephone unit user.

20. The system of claim 14 wherein for location signals, the means for generating spread spectrum signals generates a spread spectrum signal having a burst spread wave form pattern having a burst duration on the order of 10 milliseconds or less.

21. The system of claim 14 wherein for message signals, the means for generating spread spectrum signals generates a spread spectrum signal having a continuous wave wave form.

* * * * *